No. 688,791. Patented Dec. 10, 1901.
W. MOULTON.
GLASS ENGRAVING MACHINE.
(Application filed Aug. 15, 1900.)
(No Model.) 5 Sheets—Sheet 1.

Witnesses. Inventor.
Isabella Waldron. William Moulton.

No. 688,791. Patented Dec. 10, 1901.
W. MOULTON.
GLASS ENGRAVING MACHINE.
(Application filed Aug. 15, 1900.)
(No Model.) 5 Sheets—Sheet 3.

No. 688,791. Patented Dec. 10, 1901.
W. MOULTON.
GLASS ENGRAVING MACHINE.
(Application filed Aug. 15, 1900.)
(No Model.) 5 Sheets—Sheet 4.

WITNESSES. INVENTOR.
William Moulton
By his Attorneys

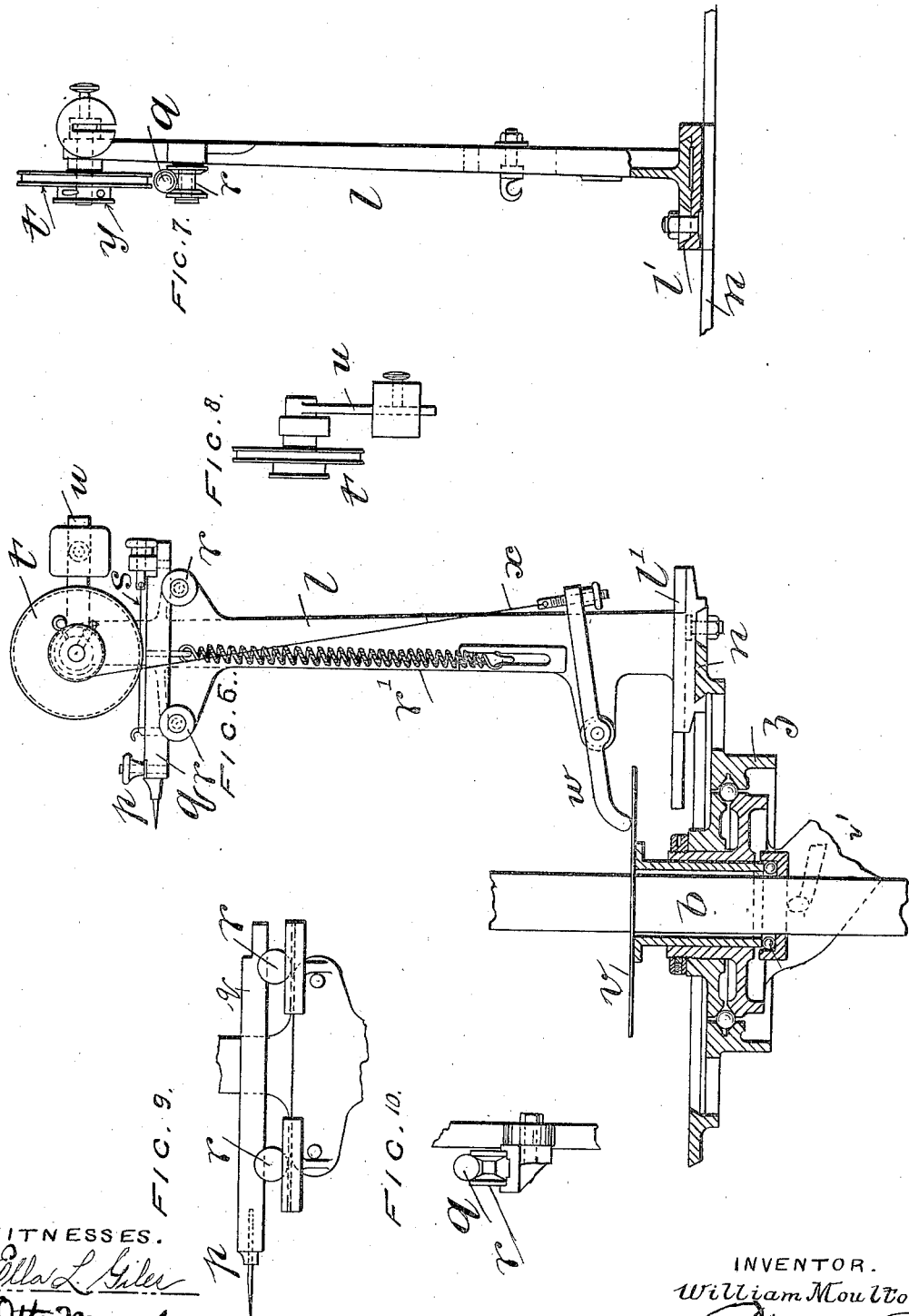

UNITED STATES PATENT OFFICE.

WILLIAM MOULTON, OF MANCHESTER, ENGLAND.

GLASS-ENGRAVING MACHINE.

SPECIFICATION forming part of Letters Patent No. 688,791, dated December 10, 1901.

Application filed August 15, 1900. Serial No. 26,932. (No model.)

*To all whom it may concern:*

Be it known that I, WILLIAM MOULTON, engineer, a subject of the Queen of Great Britain and Ireland, trading as George Moulton, residing at 10 Oak Bank, Harpurhey, Manchester, in the county of Lancaster, England, have invented certain new and useful Improvements in Glass - Engraving Machines, (for which I have made an application in Great Britain, No. 10,237, dated June 5, 1900,) of which the following is a specification.

My said invention relates to engraving-machines which are used for engraving or tracing designs upon small glass or other articles, which designs are afterward etched, as is well understood.

The principal object of my invention is to devise a machine capable of operating upon a considerable number of articles at one time, so as to increase the output or capacity of such machines.

The accompanying drawings illustrate my invention.

Figure 1:
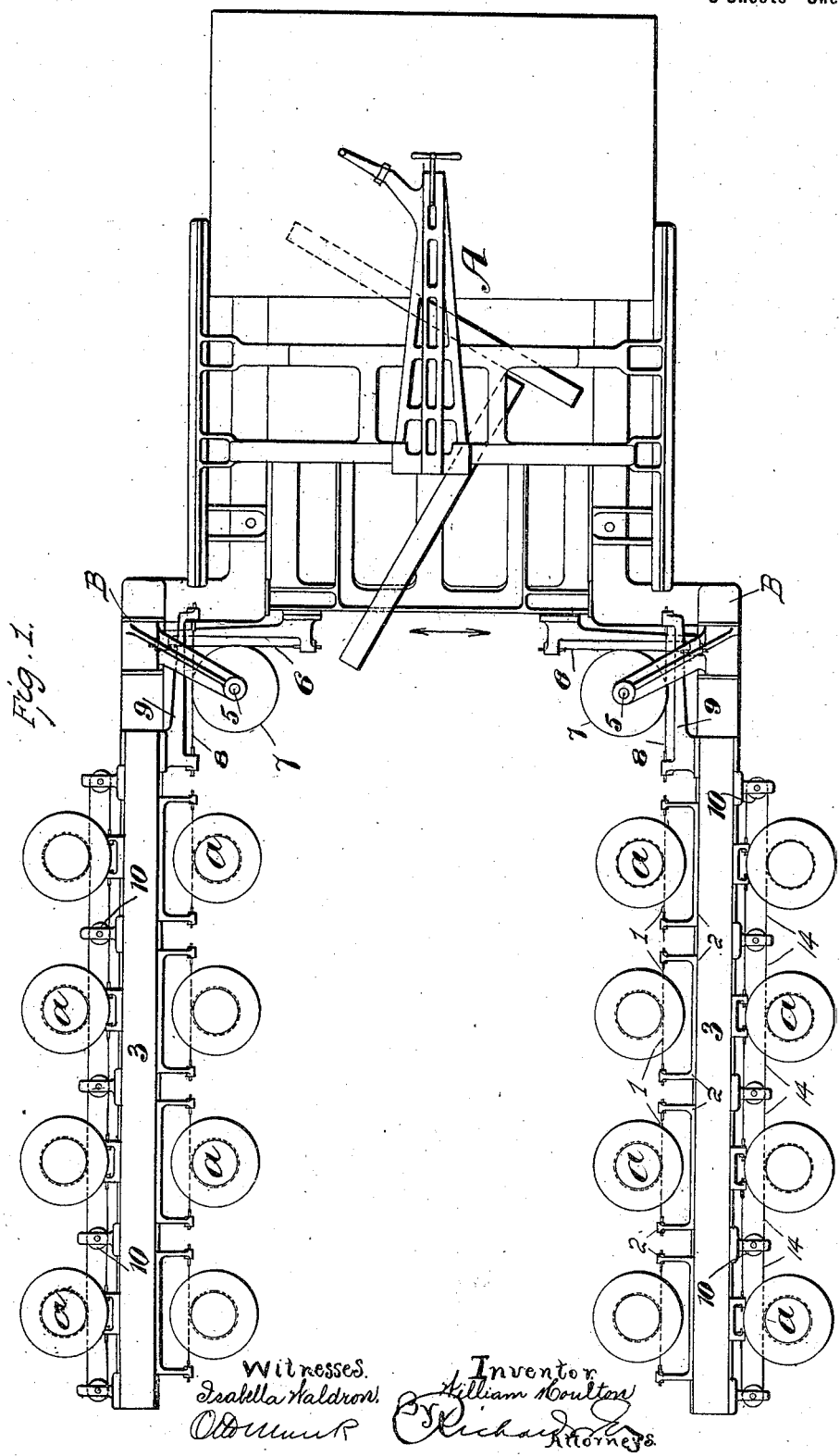
Figure 2:
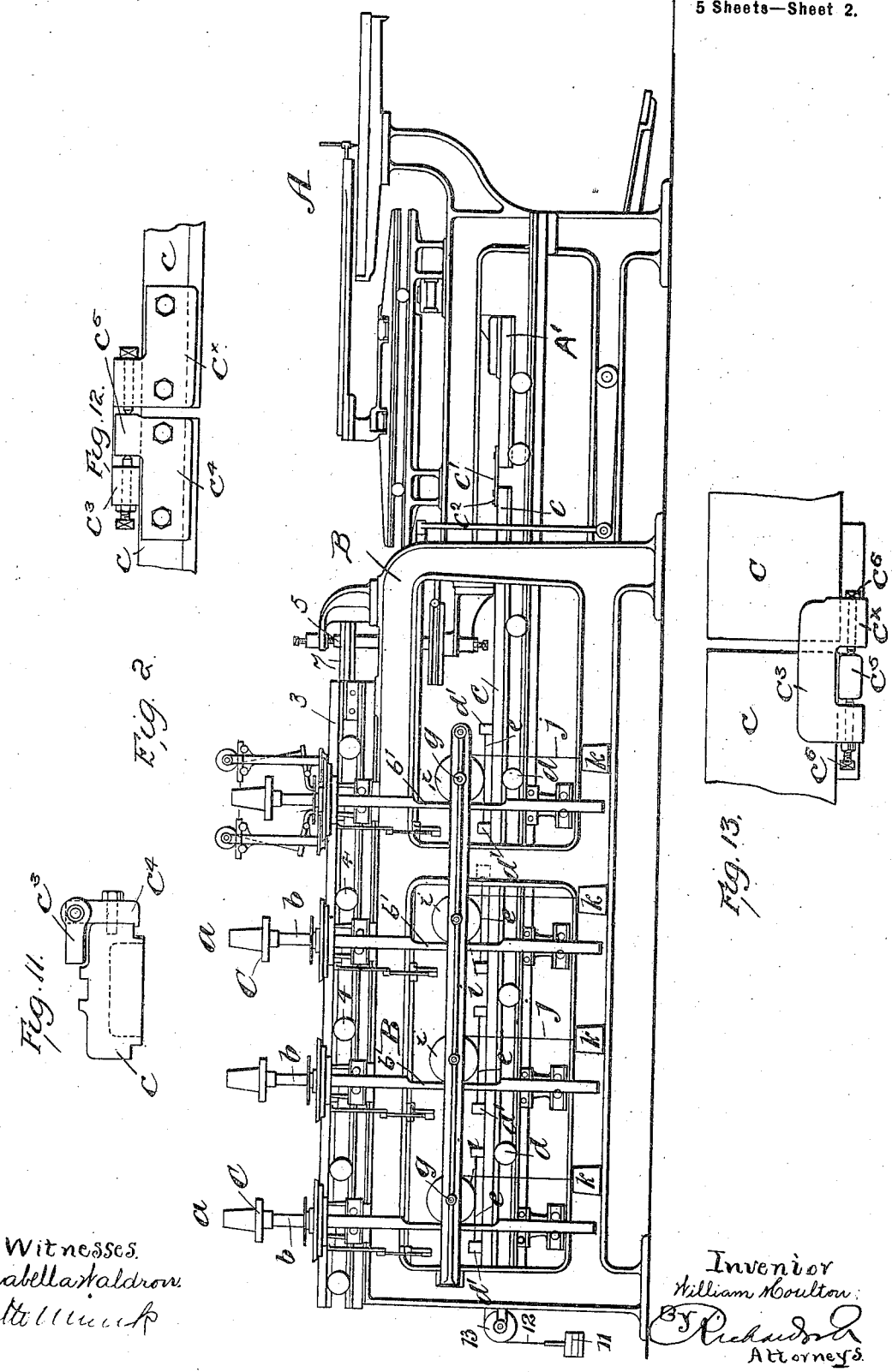
Figure 3:
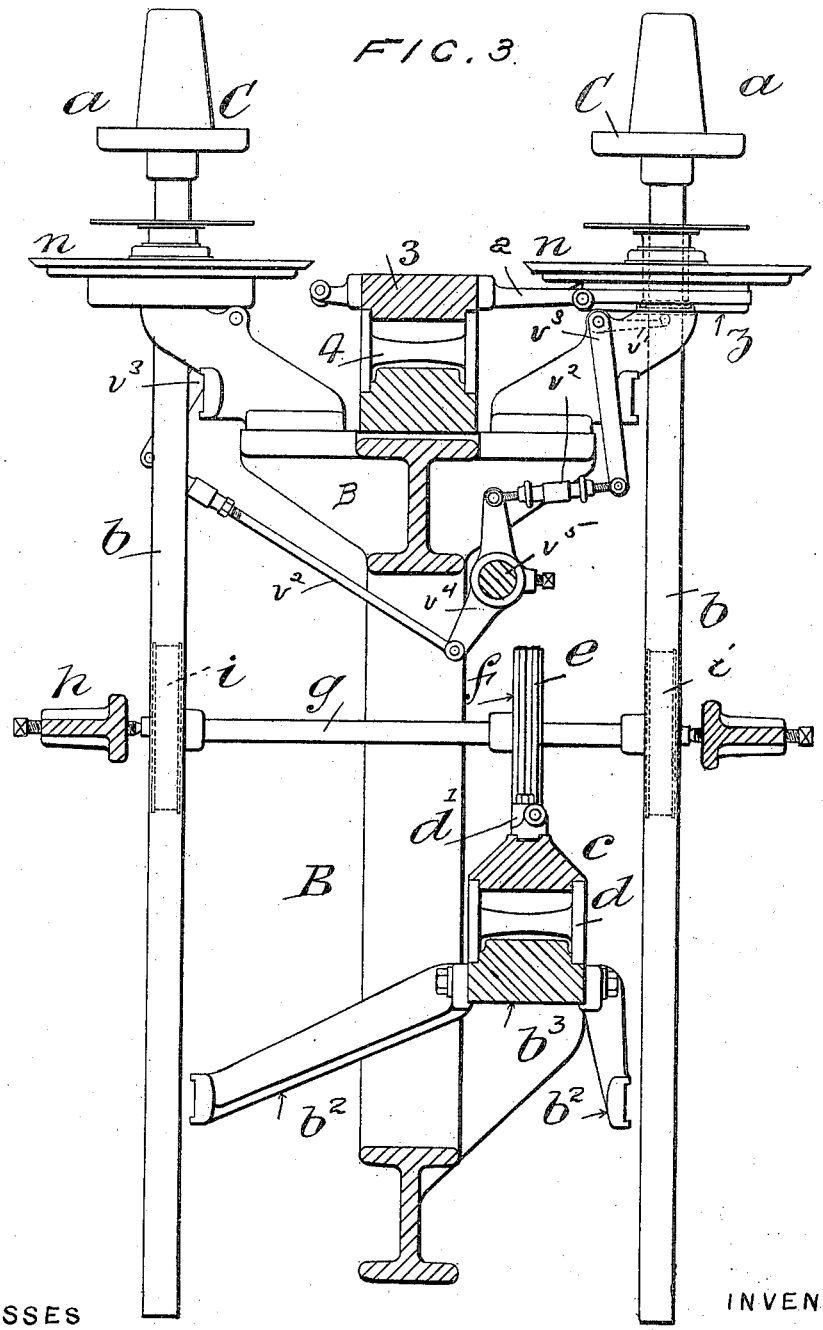
Figure 4:
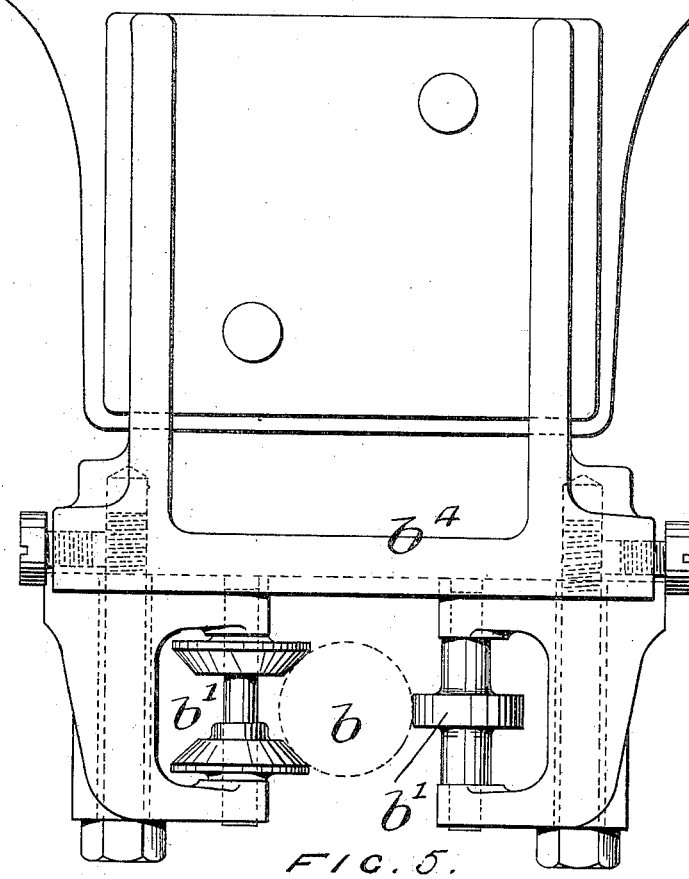
Figure 5:
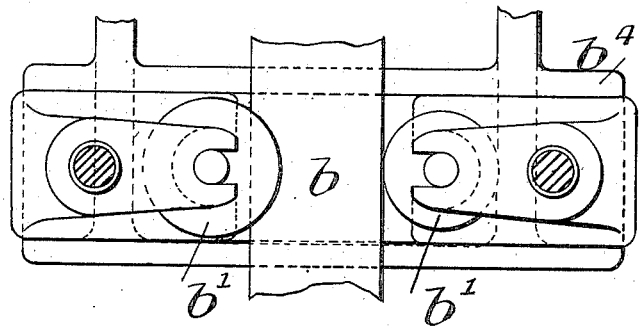

Figure 1 is a plan view. Fig. 2 is a side elevation. Fig. 3 is a transverse section. Figs. 4 and 5 are enlarged detail views of the roller-guides for the spindles $b$, in plan and side elevation, respectively. Fig. 6 is a sectional elevation of the tracer-carrying mechanism. Fig. 7 is a view at right angles thereto. Fig. 8 is a detail of the weighted arm and pulleys. Figs. 9 and 10 are detail views of a modified form of antifriction-bearing. Figs. 11, 12, and 13 are detail views.

In a machine constructed in accordance with my invention I employ the usual or a suitable pantograph - machine A, (partly shown in plan view in Fig. 1,) my invention relating more particularly to the means for carrying and operating the articles to be engraved and to operating the levers provided with the usual tracers.

At each side of the pantograph apparatus A, I provide a frame B, carrying a number of "heads" $a$—that is, tubes or spindles carrying the articles to be engraved and the tracing-levers. Any number of such heads may be mounted in the frames of the machine, and I have shown sixteen in Figs. 1 and 2, although this number may be varied. The heads $a$ of the machine are worked in pairs from the pantograph-machine, and in the following description the method of operating one pair of heads will alone be described, it being understood that the remaining heads are actuated in an identical manner.

The article to be engraved is carried upon a suitable chuck C, made, preferably, of wood and aluminium for the sake of lightness. The chuck is mounted upon a vertical tube or spindle $b$, which is reciprocated vertically, as follows: The frame is provided with a longitudinal bar $c$, resting upon antifriction-bowls $d$ and reciprocated by means of the pantograph apparatus in the well-known manner. To the reciprocating bar $c$ are secured brackets $d'$, carrying flexible metallic bands $e$, passing around a pulley $f$, mounted upon a shaft $g$, preferably upon steel centers $h$, so that as the bar $c$ is traversed to and fro the shaft is rotated in one direction or the other. The shaft $g$ is further provided with two pulleys $i\ i$, one for the vertical spindle $b$ of each head, and a band $j$, secured at one end to the vertical spindle $b$ and carrying at the other end a counterbalance-weight $k$, passes over the pulley $i$, so that as the shaft $g$ and pulleys $i\ i$ are rotated the vertical spindles $b$ are raised and lowered as required. Means are provided to prevent the spindles $b$ being rotated on their axes. For instance, the spindles $b$ may be formed with flat portions $b'$, against which the flanges on the band-pulleys $i$ come into frictional contact, as shown in Fig. 2, thus preventing the spindles from rotating. The reciprocating bar $c$ is preferably connected to the pantograph A by means of a slotted plate $c'$. By releasing the screws $c^2$ the bar A' of the pantograph may reciprocate without affecting the bar $c$, if it is desired to bring the bar $c$ to rest. The slotted plate $c'$ further provides a ready means of adjusting the whole of the spindles $b$ at any required height.

The reciprocating bar $c$ is preferably made in lengths for convenience of manufacture, such lengths being coupled together, as shown in Figs. 11 and 13. To one of the sections of the bar $c$ is secured a bracket $c^\times$, formed with a jaw $c^3$. The other section of the bar $c$ also carries a bracket $c^4$, an extension $c^5$ of which is disposed within the jaw $c^3$ and is secured thereto by means of studs $c^6$. Any other suitable form of coupling might, however, be used.

The vertical spindles $b$ are supported and guided at two or more points by antifriction-bowls $b'$, as shown in plan view in Fig. 4 and in elevation in Fig. 5. The antifriction-bowls are carried in bearings secured to brackets $b^4$ and also to brackets $b^2$, bolted to the lower rail $b^3$, upon which the bowls $d$ run.

In Figs. 6 and 7 I show in side and end elevation one of the standards $l$ used for carrying the usual tools $p$. The standard $l$ is secured upon a disk or plate $n$, which is adapted to rotate freely around the vertical spindle $b$. The plate $n$ is preferably graduated or marked out to facilitate the fixing of the standard $l$ in a circular position. To adjust the standard toward $l$ or from the work, it is mounted to slide in a graduated carrier $l'$, which is secured to the plate. The tools $p$ are carried by a sliding bar $q$ and are traversed toward or from the work in a horizontal plane. The tool-bar $q$ is mounted to slide upon bowls $r$, carried in bearings in the upper end of the standard $l$, or the bowls $r$ may run upon rails secured to the lever, as shown in side and end views in Figs. 9 and 10. A spring $r'$ tends to maintain the bar $q$ upon the bowls $r$. To keep the bars in action, I secure a band $s$ at each end of the tool-bar $q$, passing around a pulley $t$, a loaded lever $u$ on the axis of the pulley tending to rotate the pulley $t$, so as to advance the bar $q$ to its work. To take the tools $p$ out of action, I provide the vertical spindles with a slidable disk $v$, upon which rests one arm of a pivoted lever $w$, carried by the standard $l$, the other end of the pivoted lever being connected, by means of a band $x$, to another pulley $y$, forming part of or secured to the pulley $t$, provided to remove the tracers out of action, so that by raising the disk $v$ the pulley is rotated against the tension of the weight to retract the tracers. The boss of the disk $v$ rests upon a fork $v'$, which is raised by the foot of the operator through the medium of connecting-rods $v^2$ and levers $v^3$, the connecting-rods $v^2$ being adjustable to provide means for accurately adjusting the tools toward or from the work. The connecting-rods $v^2$ are operated by means of levers $v^4$, secured to the treadle-shaft $v^5$, as clearly shown in Fig. 3.

To rotate the plate $n$, carrying the standard $l$, I provide it with a pulley $z$, (see Figs. 1 and 3,) around which passes a flexible band 1, the ends of which are secured to brackets 2, carried by another reciprocating bar 3, mounted on antifriction-bowls 4. To reciprocate the bar $c$, the pantograph is operated laterally, as shown by the arrow, Fig. 1, so as to rotate each shaft 5 by means of a band 6, passing around a pulley 7 on the shaft. On each shaft 5 is another pulley, with a band 8, secured to a bracket 9, fast upon the bar 3, which is thus reciprocated by the rotation of the shaft 5. To secure uniformity of direction of rotation of the pulleys $z$ at each side of the reciprocating bar 3, I provide at one side intermediate pulleys 10, around which bands 14 pass. The plates $n$ at each side of the reciprocating bar 3 are rotated in the same directions by the motions of the bar 3. The bar 3 may also be made in lengths or sections connected together, as shown in Figs. 11 to 13.

From the foregoing description it will be apparent that the work carried by the spindles $b$ is raised and lowered as required, but is otherwise stationary on its axis, while the standards carrying the tracers are rotatable around the work. To counterbalance the weight of the work carried by the standards upon the reciprocating bar $c$, I provide and suspend therefrom a table 11 by means of a flexible band 12, passing over a pulley 13, and place the required number of weights upon the table 11.

I declare that what I claim is—

1. In combination, a double row of vertically-disposed work-supporting spindles, a lower horizontally-disposed rail between said spindles, means for reciprocating the rail, connections whereby the movement of the rail raises and lowers the spindles, a plate rotatable around the upper end of each spindle, a tool supported by said plate, a second horizontally-disposed reciprocating rail, and connections whereby the reciprocation of said rails rotates said plates, substantially as described.

2. In combination, a double row of vertically-disposed work-supporting spindles, a lower reciprocating rail disposed longitudinally between said spindles, means for reciprocating said rail, connections from said rail to said spindles whereby the movement of the rail raises and lowers said spindles, a second rail arranged directly above said first-named rail, a plurality of rotatable plates journaled concentrically of said spindles, tools carried by said plates, means for reciprocating said second rail and connections between said second rail and the plates whereby the reciprocation of said second rail rotates the plates, substantially as described.

3. In combination, a work-carrying spindle and a tool-carrying plate rotatable and vertically movable in relation to each other, a standard carried by said plate, a tool-carrier slidably carried by said standard, a pulley journaled in the standard, a band encircling said pulley and having its opposite ends connected to said tool-carrier, means for placing tension on said parts tending to advance the tool-carrier, a second pulley connected to said first-named pulley, a rocking lever pivoted on the standard, a band connected with said lever and passing around said second pulley, and means for rocking said lever, substantially as described.

In witness whereof I have hereunto set my hand in presence of two witnesses.

WILLIAM MOULTON.

Witnesses:
CHAS. H. ROBINSON,
RICHARD IBBERSON.